Figure 1:
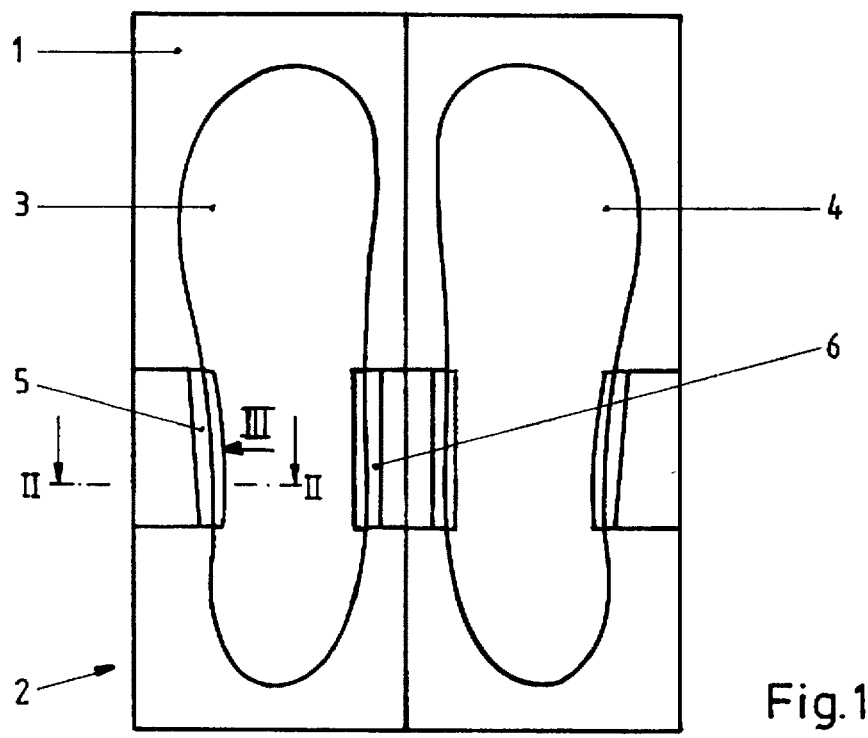

United States Patent [19]

Herber et al.

[11] Patent Number: 5,667,815

[45] Date of Patent: Sep. 16, 1997

[54] HOLLOW MOLD FOR THE MANUFACTURE OF A SANDAL

[75] Inventors: Karl-Heinz Herber, Sinntal; Karl-Ernst Kohlhepp, Schlüchtern, both of Germany

[73] Assignee: ALSA GmbH, Steinau, Germany

[21] Appl. No.: 621,877

[22] Filed: Mar. 26, 1996

[30] Foreign Application Priority Data

Mar. 31, 1995 [DE] Germany .................. 195 11 942.8

[51] Int. Cl.$^6$ .................................................. B29C 33/14
[52] U.S. Cl. .............................. 425/119; 36/11.5; 36/14; 264/244
[58] Field of Search .................... 264/244; 36/11.5, 36/14; 425/119, 129.2

[56] References Cited

U.S. PATENT DOCUMENTS

| 2,651,118 | 9/1953 | Root ............................... 264/244 |
| 3,345,763 | 10/1967 | Rollman ........................... 36/14 |
| 3,425,094 | 2/1969 | Ludwig ............................ 425/119 |
| 3,669,590 | 6/1972 | Nova et al. ...................... 425/119 |
| 3,698,108 | 10/1972 | Brunner .......................... 264/244 |
| 4,032,611 | 6/1977 | Fukuoka .......................... 264/244 |
| 4,214,334 | 7/1980 | Williams et al. ................. 36/11.5 |
| 4,475,258 | 10/1984 | Panicucci ........................ 264/244 |

FOREIGN PATENT DOCUMENTS

| 22898 | 1/1981 | European Pat. Off. ............ 36/11.5 |
| 1163996 | 10/1958 | France ........................... 36/14 |
| 1191875 | 10/1959 | France ........................... 36/14 |
| 2149043 | 3/1973 | France ........................... 36/11.5 |

*Primary Examiner*—Robert Davis
*Attorney, Agent, or Firm*—Evenson, McKeown, Edwards & Lenahan, P.L.L.C.

[57] ABSTRACT

In a sandal, lateral parts are produced without a separate cementing process in a hollow mold in a single operation as a show sole is made by foaming. To this end the hollow mold has lateral pockets in which the strap parts are fixed by a holding frame reaching partially over the bottom end of each strap part before plastic is placed in the hollow mold and the mold is closed for foaming.

1 Claim, 1 Drawing Sheet

HOLLOW MOLD FOR THE MANUFACTURE OF A SANDAL

The invention sets our from a hollow mold for the manufacture of a shoe sole and a sandal with strapping fastened thereon, the hollow mold having on both sides of the cavity forming the sole a lateral pocket to receive and affix the strapping, and which has means for fastening the strapping in the pockets, so that when the plastic is foamed the plastic will not enter behind the strapping on the outside.

A hollow mold of the above kind is the subject of AT-B-386 110. In the known hollow mold the ends of the strapping are held with their outer side in close contact with the side wall of the hollow mold by vacuum or by using a contact adhesive. Holding the strapping by vacuum has proven very problematic in practice. To achieve sufficiently great holding power relatively great vacuum pressures have to be used. Since the plastic placed in the hollow mold before foaming is very fluid it very often happens that plastic gets into the vacuum passages, so that the hollow mold and its vacuum system must be cleaned undesirably often, which is very time-consuming.

Holding the strapping by means of a contact adhesive requires an additional procedure after the sandals are removed from the hollow mold, namely cleaning the outside of the strapping and removing residual adhesive from the side walls of the hollow mold. Both entail a relatively great amount of work, so that in comparison with conventional cementing of the strapping after the shoe sole is made, hardly any production time is saved.

As it appears in GB-A 1,191,832, it is already known to fix the strapping in the hollow mold used for this purpose during production of the sole by letting the foaming plastic completely surround the bottom areas of the strapping. The strapping then penetrates into the material of the finished sole and is in this manner fastened sufficiently tightly to the sole. A disadvantage in such sandals is, however, their unsatisfactory appearance, since in the finished sandals the strapping does not reach laterally over the sole.

The invention is addressed to the problem of developing a hollow mold of the kind referred to above, which will make it possible to bond strapping to a shoe sole in a single operation, without making the hollow mold complex or requiring the strapping and/or the hollow mold to be subjected to any after-treatment.

This problem is solved according to the invention by the fact that the pockets end at a short distance from the floor of the hollow mold and have at least at the bottom of the strapping a strap-holding frame reaching slightly past the contour of the strapping.

By means of a holding frame of this kind, the strapping is prevented in a simple manner from being forced upward in the pockets of the hollow mold by the foaming plastic. At the same time the plastic is prevented from getting between the outside of the strapping and the wall of the hollow mold. The fixation of the strapping in the hollow mold can be accomplished simply by inserting the ends of the straps into the holding frame. A "seal" is thus formed for the foaming material by the portion of the holding frame that reaches over the strapping. The hollow mold according to the invention makes it possible to manufacture a sole with strapping in a single operation without the need afterward to clean the outside of the strapping or the hollow mold itself of adhesive, and it prevents the foaming plastic from getting into areas which have to be laboriously cleaned after each casting procedure.

The holding frame according to the invention has proven to be so effective that it is possible for the strapping to be held exclusively by the holding frame reaching partially over the contour of the strapping. Of course, provision can also be made for the side of the hollow mold to spring back in the strapping area, so that the strapping in the finished sandal reaches laterally over the contour of the strapping as is shown in AT-B-386 110 cited above.

The invention admits of a variety of embodiments. For further explanation of its basic principle reference will be made below to the drawing. In this drawing, FIG. 1 is a plan view of a portion of the bottom piece of an open hollow mold for producing the sandal, FIG. 2 is a cross section through the hollow mold taken along line II—II in FIG. 1, FIG. 3 is a greatly enlarged view of a side of the interior of the hollow mold, seen in the direction of an arrow III in FIG. 1.

FIG. 1 shows a bottom half of a hollow mold 2 which has cavities 3 and 4 corresponding to the shape of a right and left sandal. As shown in the case of cavity 3, the cavities 3 and 4 have outwardly facing pockets 5 and 6 into which the bottom part of a strap 8 to be seen in FIG. 3, consisting of two lateral parts 7, is to be inserted.

Figure 2:
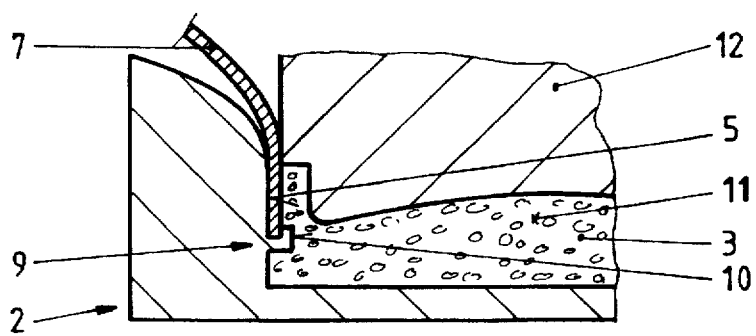

FIG. 2 shows, in the case of pocket 5, that pockets 5 and 6 have in their lower portion a holding frame 9 which has a narrow rim 10 on the inside that reaches slightly over the lateral part 7. It can also be seen in FIG. 2 that the pockets 5 and 6 do not reach all the way to the bottom of the cavity 3. In this manner a sole 11 can be produced in the hollow mold 2, and it will reach below the bottom of the strapping 8. Also indicated in FIG. 2 is the upper part 12 of the hollow mold 2.

Figure 3:
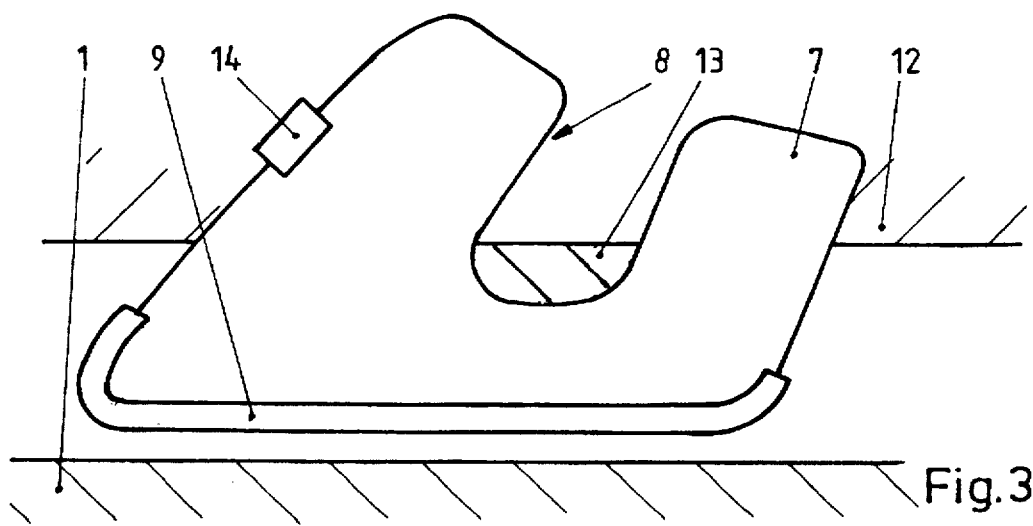

In FIG. 3 it can be seen from the side how the holding frame 9 reaches over the lateral part 7. The lateral part 7 is prevented from escaping upwardly during the foaming by a projection 13 of the bottom mold 1. In addition, a clip 14 reaches slightly over the lateral part 7.

In making a sandal, first a lateral part 7 is placed in the pockets 5 and 6 of the cavities 3 and 4. Then the necessary amount of plastic is placed in the bottom mold 1 and then the cavity is closed with the top mold 12. The foaming plastic then reliably bonds the lateral parts 7 to the developing sole 11. Polyurethane is usually used as material for the sole. In the case of the strapping it must be assured that it is firmly bonded to the sole 11 by the foaming material. This is the case for example with strapping 8 of leather, but it is also the case with strapping of plastic or rubber.

What is claimed:

1. A hollow mold for the manufacture of a sandal having a shoe sole and strapping fastened thereon comprising a cavity forming the shoe sole, lateral pockets for receiving and fixing the strapping on both sides of the cavity, and means for fixing the ends of the strapping in the pockets so that plastic foaming up in the hollow mold will not reach the back of the strapping, wherein the pockets terminate at a short distance from the bottom of the hollow mold and have a holding frame for the strapping which reaches slightly over the contour of the strapping.

* * * * *